US006358353B1

(12) United States Patent
Maliner

(10) Patent No.: US 6,358,353 B1
(45) Date of Patent: Mar. 19, 2002

(54) LABEL SCANNING SYSTEM

(75) Inventor: Bruce J. Maliner, Edgewater, NJ (US)

(73) Assignee: Lawson Mardon USA Inc., New Hyde, NY (US)

( * ) Notice: Subject to any disclaimer, the term of this patent is extended or adjusted under 35 U.S.C. 154(b) by 0 days.

(21) Appl. No.: 08/981,808

(22) PCT Filed: Jul. 8, 1996

(86) PCT No.: PCT/US96/11506

§ 371 Date: Jan. 14, 1999

§ 102(e) Date: Jan. 14, 1999

(87) PCT Pub. No.: WO97/02951

PCT Pub. Date: Jan. 30, 1997

(51) Int. Cl.[7] .......... B32B 31/00

(52) U.S. Cl. .......... 156/256; 156/64; 156/67; 156/270; 156/353; 156/354; 156/378; 428/40.1; 428/41.6; 428/42.1; 250/461.1

(58) Field of Search .......... 156/64, 67, 353, 156/354, 378; 250/461.1; 428/40.1, 41.6, 42.1

(56) References Cited

U.S. PATENT DOCUMENTS

| | | | | |
|---|---|---|---|---|
| 2,888,570 | A | 5/1959 | Toulmin, Jr. | 250/71 |
| 2,983,686 | A | 5/1961 | Konig et al. | 252/301.2 |
| 3,115,417 | A | 12/1963 | Christensen | 117/33.5 |
| 3,177,153 | A | 4/1965 | Pommer et al. | 252/301.2 |
| 3,536,550 | A | 10/1970 | Von Hofe | 156/64 |
| 3,594,933 | A | 7/1971 | Cooper | 40/2.2 |
| 3,671,451 | A | 6/1972 | Butterfield | 252/301.2 |
| 3,735,133 | A | 5/1973 | Fox | 250/72 |
| 3,776,761 | A | 12/1973 | Kato et al. | 117/76 |
| 3,891,324 | A | 6/1975 | Davies | 356/156 |
| 3,892,972 | A | 7/1975 | Cevasco | 250/458 |
| 4,009,551 | A | 3/1977 | Greenawalt et al. | 53/28 |
| 4,406,721 | A * | 9/1983 | Hoffman | 156/86 |
| 4,428,672 | A | 1/1984 | Allard et al. | 356/237 |
| 4,467,207 | A | 8/1984 | Lerner et al. | 250/459 |
| 4,596,172 | A | 6/1986 | Visser | 83/71 |
| 4,722,607 | A | 2/1988 | Anselment et al. | 356/417 |
| 5,091,006 | A | 2/1992 | Sarada et al. | 106/22 |

FOREIGN PATENT DOCUMENTS

| | | |
|---|---|---|
| FR | 1569118 | 4/1969 |
| GB | 1468013 | 3/1977 |

* cited by examiner

*Primary Examiner*—Linda Gray
(74) *Attorney, Agent, or Firm*—Venable; John P. Shannon; Chad C. Anderson

(57) ABSTRACT

A roll fed labelling system and associated label are disclosed. The label (12) includes a triggering mark (28) formed of luminophor ink, i.e. containing a fluorescent optical brightening agent, that reflects visible light when irradiated with UV light. A modulated UV light is directed at the label and the modulated reflected visible light is detected and used to trigger a cutting mechanism to separate a single label from the remainder of the roll. The triggering mark need not visibly contrast with the surrounding graphics of the label and may be invisible in visible light. When producing the roll of labels, the amount of brightening agent may be controlled by monitoring the luminescence of the triggering mark relative to a reference level which may be derived with reference to a maximum luminescence of other parts of the label.

31 Claims, 2 Drawing Sheets

LABEL SCANNING SYSTEM

TECHNICAL FIELD

The present invention relates to a labelling system and in particular to a roll fed labelling process in which labels are scanned and cut in registration prior to their application to a bottle or other container.

BACKGROUND ART

In the conventional roll fed labeling system, labels are scanned by an electronic scanner designed to detect a change in coloration between a triggering mark and the adjacent label graphics. For the system to work properly, there must be sufficient opacity of the triggering mark color; sufficient contrast between the triggering mark color and the adjacent graphics and sufficient spacing between the triggering mark and the adjacent graphics to that the scanning equipment does not confuse the one for the other.

It is possible to improve detection accuracy by interposing a colored filter between the mark and the detector, the particular color chosen to enhance contrast. This is not convenient because it entails changing filters and adjusting sensitivity levels each time there is a change in the material being scanned. This is especially so for bottlers who must change labels periodically.

Bottlers experience considerable downtime resulting from problems associated with the conventional scanning system. This is partially due to the increased use of more complex graphics and more frequent packaging changes, which require realignment and adjustment of the scanning equipment. In addition, the use of stylized, distinctly designed, bottles often requires small labels because of the contours of the bottle, thereby reducing the spacing available between a triggering mark and adjacent graphics. Finally, the increased use of promotional banners across the label to announce special offers and promotions require sharp contrasts with the remainder of the label thereby potentially interfering with the ability of conventional scanning equipment to distinguish the triggering mark from the graphics or confusing the banner or a portion thereof for the triggering mark.

It is known from U.S. Pat. Nos. 4,467,207 and 2,888,570, for example, to provide the product being scanned with a mark comprising fluorescent material and to irradiate it with ultraviolet light with a wavelength of about 365 nanometers. The mark converts the UV light to a different wavelength which is predominantly visible light and is detected by a suitable detector. As a general rule, scanning systems for labels and the like operate in ambient light which may cause some colors, such as certain greens and yellows, to emit light of much the same wavelength as that emitted by the mark. This results in high levels of interference or noise making it difficult for the detector to detect the mark. This interference or noise will depend upon the colors used in the label, and exacerbate the problem of adjusting sensitivity levels every time a label type is changed.

Further difficulties stem from the high operating speeds of modern bottling machinery, which demand speed and precision in the detection of the triggering mark to ensure that the labels are cut at the correct position.

DISCLOSURE OF INVENTION

In view of the above, it is the principle object of the present invention to provide an improved label scanning system and label which is far less sensitive to the label graphics for registration and alignment.

A further object is to provide such a scanning system and label that requires a nominal change to existing labeling equipment and can be readily adapted to existing bottling lines.

The above and other objects and advantages are attained in accordance with one aspect of the present invention by providing a roll of labels printed with conventional inks and wherein the demarcation between the individual labels is registered to associated triggering marks printed of an ink containing a luminophor, for example a fluorescent brightening agent. The label roll is irradiated with electromagnetic radiation of a first frequency, for example modulated ultraviolet light which causes the triggering mark to emit correspondingly modulated radiation of a different frequency, such as visible light. The detection of the modulated visible light is thus independent of the relationship between the triggering mark and surrounding graphics so that no color change is required to produce a sharp contrast to set off the triggering mark from the remainder of the label. Upon detection of the triggering mark a cutting assembly is activated to separate an individual label from the roll.

Preferably, the modulation is at a modulation frequency which is outside the frequency of visible light and may be in the kilohertz range, conveniently about 33 kHz.

Even when such a modulated UV light source is used, there may be interference from certain colors which are slightly fluorescent and so will also convert the modulated UV light into modulated visible light, in the same way that the triggering mark converts it. This can lead to difficulties in setting the sensitivity of the sensor so that it will detect the triggering mark but not respond to the background colors. Clearly, the signal to noise ratio, i.e. the amount of light reflected from the triggering mark as compared to light reflected from neighbouring parts of the label, will be increased by increasing the amount of luminophor material in the triggering mark. The fluorescent optical brightening material is very expensive so it is desirable to minimize the amount used. On the other hand, if there is insufficient optical brightening agent in the triggering mark, the sensor may not be able to detect it against the background "noise" or interference. The problem is exacerbated where, as is usual, the rolls of labels are produced by an independent supplier and it is left to the bottler to adjust sensitivity levels to suit the different labels and compensate for different colors and color combinations.

According to another aspect of the present invention, a method of producing labels for applying to containers in the manner defined in the first aspect, includes the steps of producing a roll of said labels with said triggering marks each registered to a label, scanning the roll of labels using radiation at a first frequency, for example UV light, and obtaining a measure of the amount of radiation at a second frequency, for example visible light, emitted by a said triggering mark in response to irradiation by the radiation at the first frequency; comparing the measured radiation with a reference level representing a maximum level of radiation at the different frequency emitted by colored parts of the label when irradiated by said radiation at the first frequency and, if the radiation from the triggering mark does not exceed said maximum by a predetermined margin, increasing the amount of luminophor material in the triggering mark.

The reference level may be derived by measuring such radiation, e.g. visible light, emitted by selected colored portions of the label when irradiated by said radiation at the first frequency. The colored portions selected may be those which will subsequently be scanned by the sensor.

BRIEF DESCRIPTION OF THE DRAWINGS

An embodiment of the invention will now be described, by way of example only, with reference to the accompanying drawings, in which.

BEST MODE FOR CARRYING OUT THE INVENTION

Figure 1:
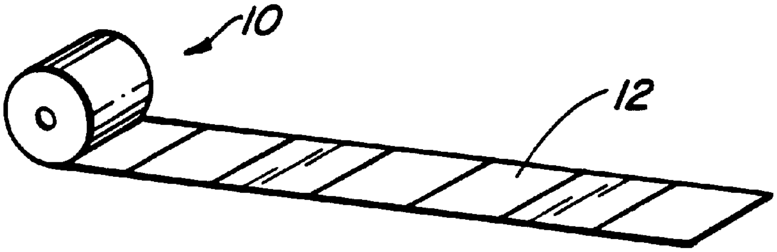
FIG. 1 is a plan view of a series of labels on a roll containing triggering marks in accordance with the present invention.
Figure 2:
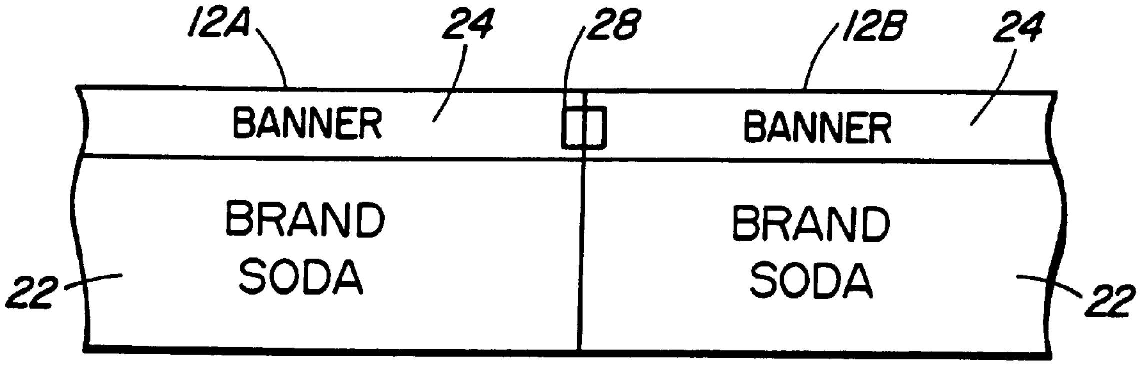
FIG. 2 is an enlarged plan view of two adjacent label repeats from the roll.
Figure 3:
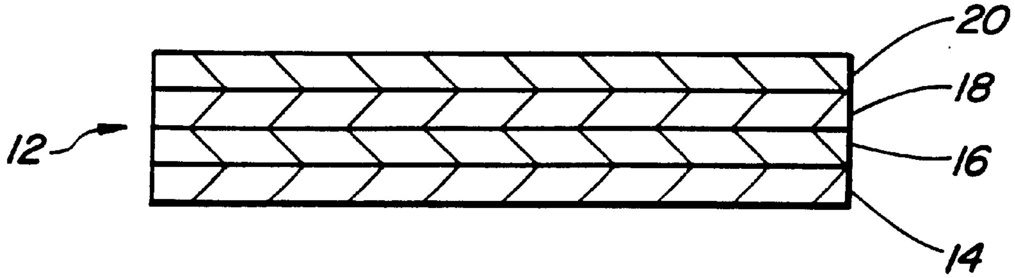
FIG. 3 is a schematic representation of a typical label structure used for soft drink bottles.

Reference is now made to the drawings and to FIG. 1 in particular wherein a roll 10 of labels 12 as typically used by the beverage packaging industry is illustrated. In practice several labels are printed at the same time transversely across a master roll, which is then sliced to form a plurality of single rolls 10. Each of the rolls 10 contains a plurality of repeats of the individual labels 12 arranged immediately adjacent each other. As shown in FIG. 3, the labels are commonly formed of a laminate consisting of a bottom ply 14 of white OPP (oriented polypropylene) on which the label graphics are printed. An adhesive coating 18 is applied over the printing ink layer 16 and a clear OPP layer 20 is applied to the adhesive.

A typical label may include graphics indicating the brand, flavor, logo etc. and a banner announcing a special price or promotion. Labels are commonly printed in multicolors for enhanced eye-appeal to the consumer. The individual labels are separated from each other by a line 26 that is registered to a triggering mark 28. The triggering mark 28 may be on the cut line 26 or a fixed distance from the cut line. In either case, the triggering mark serves to activate a cutting mechanism to separate a single label from the roll as will be described. The cut line 26 may be a visible line, actually separating the graphics of the individual labels from one another, or simply the line at which the roll is to be cut but not bearing any particular distinguishing characteristic. That is, the graphics of labels 12*a* and 12*b* may simply run into each other on the roll across the interface between the labels.

In accordance with the present invention, the triggering mark 28 is formed with a luminophor ink, i.e. an ink which includes a fluorescent optical brightening agent. Such fluorescent optical brightening agents are available commercially under the trade name UVITEX OB from the Ciba Additives division of Ciba-Geigy, Hawthorne, N.Y. and under the trade name BLANKOPHOR SOL from Bayer Corporation, Industrial Chemicals Division. The fluorescent optical brightening agents, and hence the luminophor inks, have the property of reflecting invisible UV light as longer wave length visible light.

The UV light is modulated at a particular frequency and sensors which contain spectral filters and respond only to visible light modulated to the particular frequency serve to detect the triggering mark. Such sensors are made, for example, by SICK Optic-Electronics, Inc. of Eden Prairie, Minn. A preferred sensor has a light source emitting light with a wavelength of about 365 nanometers and applies the modulation simply by interrupting the light source at the specified frequency of about 33 kilohertz. A suitable filter at the sensor output has a corresponding selection frequency of 33 kHz. so that the sensor is substantially insensitive to light from other sources which does not have the modulation. The present invention makes use of such inks and such sensors in the manner described.

In accordance with the present invention, the roll of labels 10 is printed in the usual manner except that the triggering marks 12 are printed with luminophor ink. The triggering mark 12 may comprise a line extending across the entire width of the label, merely comprise a block as shown, or comprise any relatively small portion of the label graphics. The latter is preferred since the cost of the luminophor ink is approximately 10 times that of conventional ink so that a substantial cost advantage can be achieved by minimizing the area of the label printed with the luminophor ink. The location of the triggering mark with respect to the edge of the individual label is immaterial so long as the distance is known. Similarly, the color of the triggering mark is immaterial and thus the triggering mark may be transparent or pigmented to invisibly blend into the adjacent graphics. Further, the graphics adjacent to the triggering mark need not contrast with the triggering mark (as in conventionally printed rollfed labels) and thus the graphics can extend right up to the very edge of the label and even across the interface between adjacent labels.

Figure 4:
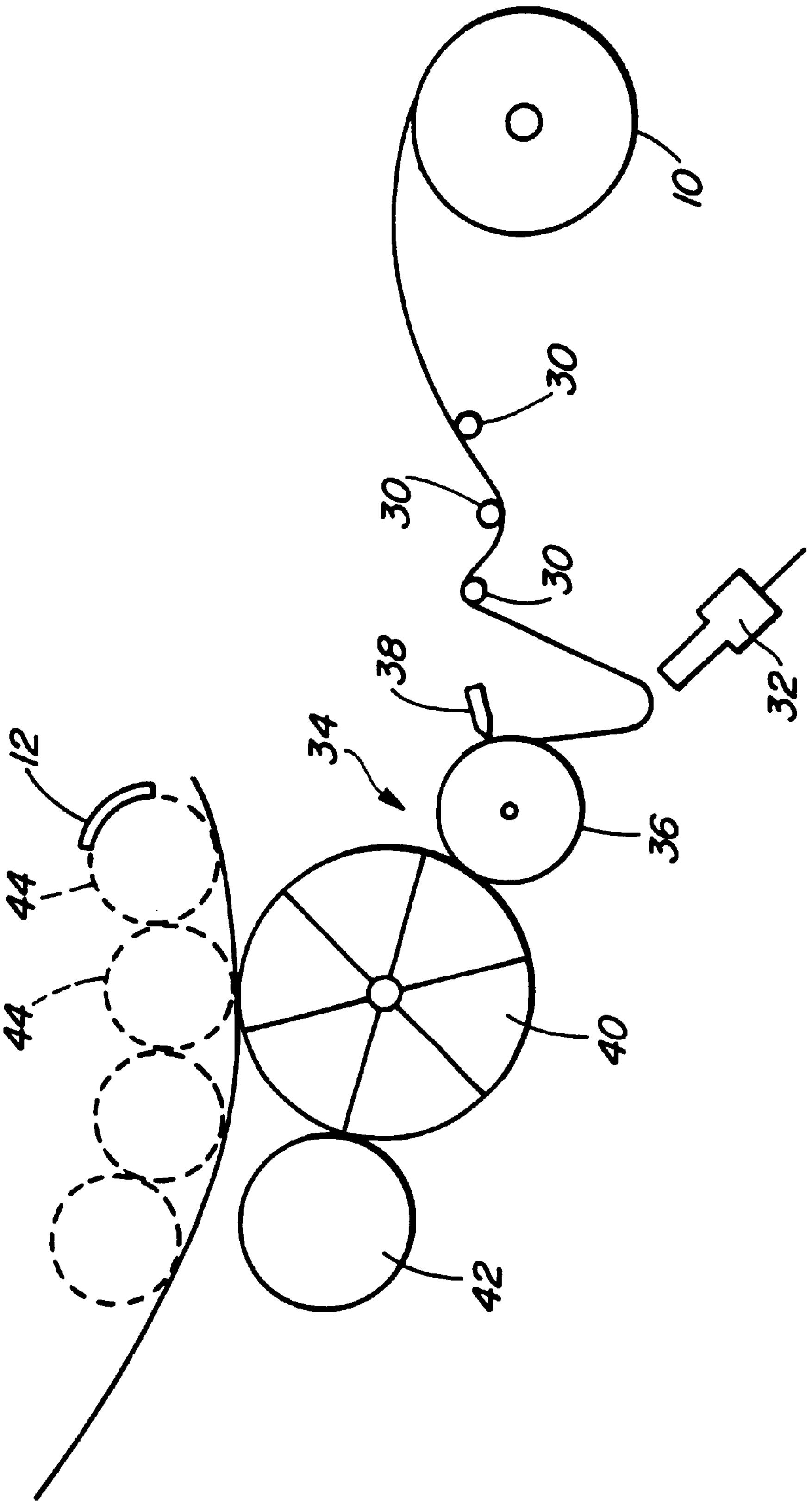
FIG. 4 is a schematic view of a bottle labelling system in accordance with the present invention.

The label application system of the present invention is depicted in FIG. 4. A roll of labels 10 is fed through idler rolls 30 past a luminescence sensor 32. The sensor 32 contains a modulated UV light source as well as a spectral filter element that filters out light at wavelengths other than those emitted by the luminophor ink, such that the sensor 32 will generally respond only to the emitted visible light reflected off the triggering mark of a label. The light source emits light in the UV range, i.e. 365 nanometers. Modulation is applied to the light from the UV light source, conveniently by interrupting the light at a rate of 33 kHz. The corresponding visible light emitted by the triggering mark will be in the visible range, but will still include the 33 kHz. modulation. The luminescence sensor 32 detects the light reflected from the label roll and uses a filter to detect the 33 kHz. modulation, rejecting visible light from other sources which also is reflected from the label roll but not modulated at 33 kHz. In particular, the sensor 32 will reject light from certain colors in the graphics, such as some yellows and greens, which may tend to fluoresce and emit light at much the same frequency as the triggering mark.

The detection of the triggering mark is used to control a cutter assembly 34 consisting of a blade 38 and rotor 36. The blade 38 is controlled by the sensor 32 to move toward the rotor to cut the lagging end of the leading label 12, thereby separating it from the remainder of roll 10. The separated label is transported by rotor 38 to a vacuum pick off 40 that holds a label in place as it rotates to move the label 12 past a glue applicator 42. The glued label is then rotated by the vacuum pick off to align with filled bottles, where the vacuum is released and the label 12 is transferred to a passing bottle 44.

Modulating the UV light reduces interference from ambient light reflecting off the label and/or the triggering mark. There is still a possibility, however, that one or more of the colors used in the label will be slightly fluorescent so that, as the color is scanned by the sensor 32, it too will emit modulated visible light. In order to ensure that the sensor will respond to the modulated visible light from the triggering mark but not respond to the modulated visible light from the background colors, the amount of brightening agent in the ink used for the triggering mark is carefully controlled to ensure that the modulated visible light from the triggering mark, when scanned, is always significantly greater than that from any of the background colors.

The amount of brightening agent is controlled with reference to the sensitivity of the sensor 32 as well as emission levels of the various colors. The sensitivity of the sensor 32 is set at a level which is just low enough to ensure that it will not respond to modulated visible light of a predetermined level, which is arranged to be greater than that from any of the colors to be used in the labels. This level can be determined by measuring various colors.

During production of the roll of labels, at least one label is scanned using a test sensor similar to sensor 32 but with a digital readout of detected light levels. For example, the test sensor may be a model LUT 1–5 by the above-mentioned SICK Optic-Electronics, Inc. Each color which subsequently will lie in the path scanned by the sensor 32 is scanned by the UV light source and the amount of corresponding visible light is measured to ensure that it is less than the above-mentioned predetermined level of modulated visible light. The triggering mark also is scanned using the UV light source and the amount of corresponding visible light measured to ensure that it is greater than a reference level and hence exceeds, by a predetermined margin, the maximum of the background light levels measured for the label colors. Typically, the margin will be a ratio of three or more to one. Alternatively, the reference level might be determined with reference to the predetermined level for the sensor 32. If the amount of modulated visible light from the triggering mark is insufficient, more brightening agent is added to the ink, following which the measurements may be repeated.

During the course of a production run, sample labels may be tested in the manner described above to ensure that the ratio between light levels for the triggering mark and the background colors is maintained.

In the event that the light emitted by one of the colors during the test exceeds the predetermined level for the sensor 32, and it is not possible to change it, the amount of brightening agent may be increased to obtain the required margin. Alternatively, the roll of labels may be rejected.

There is no need to change the sensitivity of sensor 32, even when the labels are changed, providing each roll of labels provides the required light emission levels.

Industrial Applicability

The present invention advantageously improves the application of labels to containers, especially bottles, using high speed machinery. In view of the modulation of the light source, and the measurement of the triggering mark luminescence during production, the sensor is substantially oblivious to all of the graphics of the label other than the luminescent triggering mark, and the registration of the labels may be very closely controlled. Further, since the sensor is "blind" to all of the graphics of the label other than the triggering mark, the graphics can be designed without any concern for the triggering mark. That is, there need not be any sharp change between the colors of the triggering mark and adjacent graphics in order to provide the contrast necessary to set off the triggering mark for the detector.

Monitoring of the triggering marks during production and, where necessary, adjusting the amount of brightening agent, makes it possible to leave the sensitivity setting of the sensor used to control the cutting of the labels unchanged at a level which will ensure that the sensor does not detect background colors yet will detect the triggering marks consistently.

We claim:

1. A method of applying labels to containers comprising the steps of:

providing a continuous roll of labels, each of said labels having one or more colored portions and a triggering mark thereon registered to an interface between said label and an adjacent label, said triggering mark being formed of luminophor ink and said colored portions each being formed of a colored ink that is different from said luminophor ink, such that, when irradiated by UV light, said triggering mark will emit visible light at an intensity that is greater by a predetermined amount than the maximum intensity of visible light emitted by said colored portions, directing a modulated UV light at said label whereby to cause a said triggering mark to emit correspondingly modulated visible light;

receiving visible light from said label roll and detecting the modulated visible light emitted by said triggering mark; and controlling a cutter to slice a label off said roll at said interface based upon said detection of said modulated visible light emitted by said triggering mark.

2. A method as claimed in claim 1, wherein the modulation is at a modulation frequency other than the frequency of the visible light emitted by the triggering mark in response to irradiation by the modulated UV light, and detection includes filtering light received from said label roll and producing a signal in dependence upon said modulated visible light emitted by the triggering mark and filtering said signal to detect said modulation frequency.

3. A method as claimed in claim 1, comprising the further steps of applying an adhesive to said sliced off label and thereafter attaching said sliced off label to a container.

4. A method according to claim 1, wherein the UV light is modulated at a frequency lower than that of visible light.

5. A method according to claim 1, wherein the UV light is modulated by interrupting the UV light at a frequency of about 33 kilohertz.

6. A method of applying labels to containers comprising the steps of:

providing a continuous roll of labels, each of said labels having a triggering mark thereon registered to an interface between said label and an adjacent label, said triggering mark being formed of luminophor ink;

directing a modulated UV light at said label whereby to cause a said triggering mark to emit correspondingly modulated visible light;

receiving visible light from said label roll and detecting the modulated visible light emitted by said triggering mark; and controlling a cutter to slice a label off said roll at said interface based upon said detection of said modulated visible light emitted by said triggering mark, further comprising the preceding steps of:

(i) producing said continuous roll of said labels with said triggering marks each registered to an interface between adjacent labels;

(ii) scanning the roll of labels using UV light and obtaining a measure of the amount of visible light emitted by a said triggering mark in response to irradiation by the UV light;

(iii) comparing the measured light with a reference level to determine whether or not the measured light exceeds by a predetermined margin a maximum level of light emitted by colored parts of the label when irradiated by said UV light; and (iv) if the measured light from the triggering mark does not exceed said maximum level by said predetermined margin, increasing the amount of luminophor material in the triggering marks.

7. A method as claimed in claim 6, wherein the reference level is derived by measuring visible light emitted by selected colored portions of the label when irradiated by said UV light source.

8. A method as claimed in claim 7, wherein the colored portions selected are those which will subsequently be scanned by the sensor.

9. A method according to claim 6, wherein the UV light is modulated at a frequency lower than that of visible light.

10. A method according to claim 6, wherein the UV light is modulated by interrupting the UV light at a frequency of about 33 kilohertz.

11. A method of applying labels to containers comprising the steps of:

providing a continuous roll of labels, each of said labels having one or more colored portions each formed of a colored ink and a triggering mark thereon registered to an interface between said label and a adjacent label, said triggering mark being formed of luminophor ink that, when irradiated by electromagnetic radiation at one frequency, emits electromagnetic radiation at a different frequency, the amount of luminophor is said triggering mark being such that said electromagnetic radiation at said different frequency will have an intensity that exceeds by a predetermined amount the maximum of any electromagnetic radiation at said different frequency emitted by said colored portions;

directing modulated electromagnetic radiation of said one frequency at said label whereby to cause a said triggering mark to emit correspondingly modulated electromagnetic radiation at said different frequency and that exceeds by a predetermined amount the maximum of modulated electromagnetic radiation at said different frequency emitted by said colored portions;

receiving electromagnetic radiation from said label roll and detecting the modulated electromagnetic radiation of said different frequency emitted by said triggering mark; and controlling a cutter to a slice a label off said roll at said interface based upon said detection of said modulated radiation emitted by said triggering mark.

12. A method according to claim 11, wherein the modulated electromagnetic radiation of said one frequency is modulated at a frequency lower than that of visible light.

13. A method according to claim 11, wherein the modulated electromagnetic radiation of said one frequency is modulated at a frequency of about 33 kilohertz.

14. A method of producing rolls of labels for applying to containers under the control of a sensor having a source of modulated radiation of a first frequency and means for detecting corresponding modulated radiation of a different frequency emitted by triggering marks registered with the labels, the triggering marks comprising a luminophor material that, when irradiated by modulated electromagnetic radiation at said first frequency, emits a correspondingly modulated electromagnetic radiation at said different frequency, the method comprising the steps of:

(i) producing a roll of labels with said triggering marks each registered to a label, (ii) scanning the rolls of labels using modulated radiation at said first frequency and obtaining a measure of the amount of correspondingly modulated radiation at said different frequency emitted by a said triggering mark in response to irradiation by the modulated radiation at said first frequency;

(iii) comparing the measured radiation with a reference level to determine whether or not the measured radiation from the triggering mark exceeds by a predetermined margin a maximum level of radiation at said different frequency emitted by colored parts of the label when irradiated by said radiation at said first frequency; and (iv) if said measured radiation does not exceed said maximum level of radiation by said predetermined margin, increasing the amount of luminophor material in the triggering mark.

15. A method according to claim 14, wherein the modulated electromagnetic radiation of said one frequency is modulated at a frequency lower than that of visible light.

16. A method according to claim 14, wherein the modulated electromagnetic radiation of said one frequency is modulated at a frequency of about 33 kilohertz.

17. A method of producing rolls of labels for applying to containers under the control of a sensor having a UV light source and means for detecting such UV light reflected from triggering marks registered with the labels, the triggering marks comprising a luminophor material, the method comprising the steps of:

(i) producing a roll of said labels with said triggering marks each registered to a label, (ii) scanning the roll of labels using modulated UV light and obtaining a measure of the amount of corresponding modulated visible light emitted by a said triggering mark in response to irradiation by the modulated UV light;

(iii) comparing the measured light with a reference level representing a maximum level of light emitted by colored parts of the label when irradiated by said UV light; and (iv) if the visible light from the triggering mark does not exceed said maximum level by a predetermined margin, increasing the amount of luminophor material in the triggering mark.

18. A method as claimed in claim 17, wherein the reference level is derived by measuring visible light emitted by selected colored portions of the label when irradiated by said UV light source.

19. A method as claimed in claim 18, wherein the colored portions selected are those which will subsequently be scanned by the sensor.

20. A method according to claim 17, wherein the UV light is modulated at a frequency lower than that of visible light.

21. A method according to claim 17, wherein the UV light is modulated by interrupting the UV light at a frequency of about 33 kilohertz.

22. A method of producing a roll of labels for use in a continuous feed labeling system wherein triggering marks on said rolls are detected by irradiating the labels in succession with electromagnetic radiation at a first frequency and detecting corresponding electromagnetic radiation at a second frequency emitted by the triggering marks, each of the triggering marks comprising luminophor ink which, when exposed to said electromagnetic radiation at said first frequency, emits electromagnetic radiation at said second frequency, the method comprising the steps of:

(i) producing said roll of labels with said triggering marks each registered to an interface between adjacent labels in the roll;

(ii) irradiating the roll of labels using electromagnetic radiation at said first frequency light and measuring corresponding electromagnetic radiation at said second frequency emitted by said triggering marks and by other parts of said roll of labels;

(iii) determining from the measured electromagnetic radiation of the second frequency whether or not the electromagnetic radiation at the second frequency emitted by the triggering marks exceeds by a predetermined margin a maximum level of electromagnetic radiation of the second frequency emitted by said other parts of the roll of the labels; and (iv) increasing the amount of luminophor material in the triggering marks if the measured electromagnetic radiation at the second frequency emitted by the triggering marks does not exceed said maximum level by said predetermined margin.

23. A method according to claim 22, wherein the step of measuring said electromagnetic radiation emitted by parts of the labels measures said electromagnetic radiation emitted by parts of the labels which, during feeding of the roll of labels in said continuous feed labeling system, will follow substantially the same path as that taken by the triggering marks.

24. A method according to claim 22, wherein the first frequency is in the ultraviolet light range and the second frequency is in the visable light range.

25. A label for use in a continuous feed labeling system, wherein said label (12) includes one or more colored portions thereon and at least one triggering mark (28) registered to an edge of said label, said triggering mark being formed of luminophor ink capable of emitting visible light when exposed to UV light, said colored portions each being formed of a colored ink that is different from said luminophor ink, the amount of luminophor in said triggering mark being predetermined such that said visible light emitted by said triggering mark has an intensity that exceeds by a predetermined amount the maximum intensity of visible light emitted by said colored portions.

26. A label as claimed in claim 25, wherein only said triggering mark is formed of luminophor ink.

27. A label as claimed in claim 25, comprising a portion of a roll (10) made up of other identical labels arranged side by side and wherein graphics extend without interruption between adjacent labels.

28. A label as claimed in claim 25, wherein said graphics and said triggering mark are formed of non-contrasting ink pigments.

29. A label as claimed in claim 25, wherein said luminophor ink is transparent.

30. Rolls of printed labels for use in a continuous feed labelling system having a sensor for detecting triggering marks on said rolls, each label having a triggering mark associated with a respective one of said labels, wherein each roll comprises labels having one or more colored portions printed with inks having colors different from those of labels in others of said rolls, the triggering marks on each roll of labels each comprising a luminophor ink that, in response to exposure to electromagnetic radiation of a first frequency, emits electromagnetic radiation of a second frequency detectable by the sensor, and the colored portions being formed from an ink that is different from said luminophor ink, wherein the amount of luminophor ink in each triggering mark is predetermined so that the electromagnetic radiation of the second frequency emitted by the triggering mark can be reliably distinguished by said sensor from electromagnetic radiation at said different frequency that is emitted by the colored portions of the associated label.

31. Rolls according to claim 30, wherein said luminophor ink is responsive to electromagnetic radiation having a said first frequency in the ultraviolet range to emit light having a said second frequency in the visible range.

* * * * *